US009822573B2

(12) United States Patent
Son et al.

(10) Patent No.: US 9,822,573 B2
(45) Date of Patent: Nov. 21, 2017

(54) APPARATUS FOR AND METHOD OF CONTROLLING POWER WINDOW BY USING OUTPUT CURRENT OF MOTOR

(71) Applicant: DY AUTO Corporation, Asan-si (KR)

(72) Inventors: Dong Hun Son, Pohang-si (KR); Eui Cheol Jeong, Gwangmueong-si (KR)

(73) Assignee: DY AUTO CORPORATION (KR)

( * ) Notice: Subject to any disclaimer, the term of this patent is extended or adjusted under 35 U.S.C. 154(b) by 382 days.

(21) Appl. No.: 14/630,282

(22) Filed: Feb. 24, 2015

(65) Prior Publication Data

US 2015/0247351 A1 Sep. 3, 2015

(30) Foreign Application Priority Data

Feb. 28, 2014 (KR) ........................ 10-2014-0024625

(51) Int. Cl.
*B60L 1/00* (2006.01)
*E05F 15/40* (2015.01)
*E05F 15/695* (2015.01)

(52) U.S. Cl.
CPC ............ *E05F 15/40* (2015.01); *E05F 15/695* (2015.01); *E05Y 2400/33* (2013.01); *E05Y 2900/55* (2013.01)

(58) Field of Classification Search
CPC ........................................................ E05F 15/40
See application file for complete search history.

(56) References Cited

U.S. PATENT DOCUMENTS

2005/0104546 A1* 5/2005 Ohshima ................. H02P 29/02 318/265

FOREIGN PATENT DOCUMENTS

JP 06066063 A 3/1994

OTHER PUBLICATIONS

Korean Intellectual Property Office Notice of Allowance Application No. 1020140024625 Date: Oct. 27, 2014 pp. 7.

* cited by examiner

*Primary Examiner* — Daniel Puentes
(74) *Attorney, Agent, or Firm* — St Onge Steward Johnston and Reens LLC

(57) ABSTRACT

An apparatus and method of controlling a power window by using an output current of a driving motor. The output current is measured to calculate and store a current reduction time, and then, execution of a safety function is delayed when an interruption in ascending of the window glass is sensed, so that interruption caused by noise generated when a car moves over an unpaved road or road bumps may be distinguished from interruption caused by an actual obstacle. Then, the safety function is prevented from being executed if the interruption in the ascending of the window glass is caused by the noise. Therefore, the interruption of the ascending of window glass due to the noise generated when the car moves on the unpaved road or road bumps may be distinguished without using an additional sensor.

9 Claims, 3 Drawing Sheets

APPARATUS FOR AND METHOD OF CONTROLLING POWER WINDOW BY USING OUTPUT CURRENT OF MOTOR

FIELD OF THE INVENTION

One or more exemplary embodiments relate to an apparatus for and method of controlling a power window by using an output power of a motor, and more particularly, an apparatus for and method of controlling a power window, whereby an output current of a driving motor driving a window glass is measured to calculate and store a current reduction time and execution of a safety function is delayed as much as the stored current reduction time when an interruption in ascending of the window glass is sensed so as to distinguish interruption due to noise generated during driving over a bump or unpaved road from interruption caused by an actual obstacle, thereby preventing the safety function from being executed when ascending of the window glass is interrupted due to noise.

BACKGROUND OF THE INVENTION

A power window device has a safety function, that is, a window glass is automatically stopped from ascending when an obstacle is sensed while the window glass is moving up. When a driver or a passenger closes the window glass by using a switch, an arm, head, or neck of another person may be accidentally stuck between the window glass and a window frame. The power window device having the safety function automatically stops the window glass from ascending when an obstacle is stuck between the window glass that is moving up and the window frame in order to prevent such an accident.

However, an algorithm for realizing the safety function according to the prior art may cause a malfunction if a car is moving on a harsh road (for example, an unpaved road or a road with a lot of bumps), an external shock is applied to the car, or ascending of the window glass is interrupted by a frictional force between the window glass and the window frame.

FIG. 1 shows a case when a vibration force or a shock is applied to a car 10, that is, a case when a window glass starts to ascend when the car 10 passes over a bump 30 on a road or a rough unpaved road.

As shown in FIG. 1, if the vibration force or shock is applied to the window glass due to the bump 30, a power window control apparatus according to the prior art may execute a safety function as if an obstacle exists between the window glass and the window frame, although no obstacle actually exist between them.

In order to prevent the occurrence of a malfunction when the safety function is executed, an algorithm for distinguishing an actual obstacle from a noisy disturbance caused by the bump or the unpaved road while the window glass is moving up is necessary.

SUMMARY OF THE INVENTION

One or more embodiments include an apparatus for and a method of controlling a power window by using an output current of a driving motor. The output current of the driving motor that drives a window glass is measured to calculate and store a current reduction time, and then, execution of a safety function is delayed when an interruption in ascending of the window glass is sensed, so that interruption caused by noise generated when a car moves on an unpaved road or road bumps may be distinguished from interruption caused by an actual obstacle. Then, the safety function is prevented from being executed if the interruption in the ascending of the window glass is caused by the noise.

Additional aspects will be set forth in part in the description which follows and, in part, will be apparent from the description, or may be learned by practice of the presented embodiments.

According to one or more embodiments, an apparatus for controlling a power window by using an output current of a motor, the apparatus includes: a current measuring unit for measuring an output current of a driving motor, the output current being proportional to a number of revolutions of the driving motor configured to drive a window glass; a timer for analyzing the output current and for calculating and storing a current reduction time, the current reduction time being equal to a time period of a section where the output current is reduced; and a safety execution unit for analyzing the output current, delay execution of a safety function as much as the current reduction time when the output current reaches a maximum limitation value, and executing the safety function for suspending ascending of the window glass or descending the window glass according to a result of comparing the output current with the maximum limitation value.

The safety execution unit may be configured to execute the safety function when the output current is equal to or greater than the maximum limitation value and may be configured not to execute the safety function when the output current is less than the maximum limitation value.

The timer may be configured to store the current reduction time during a last section when the output current is reduced.

The timer may be configured to delete the current reduction time stored in the timer when the output current is stabilized.

The timer may be configured to delete the current reduction time stored in the timer when the window glass is in a stopped state for a reference time after starting a car whereon the apparatus is mounted.

The safety execution unit may be configured to execute the safety function as soon as the output current reaches the maximum limitation value, when the timer does not store the current reduction time.

According to one or more embodiments, a method of controlling a power window by using an output current of a driving motor, the method includes: measuring the output current of the driving motor via a current measuring unit, the output current being proportional to a number of revolutions of the driving motor configured to drive a window glass; analyzing the output current via a timer, and calculating and storing a current reduction time, the current reduction time being equal to a time period of a section where the output current is reduced; and delaying execution of a safety function as much as the current reduction time stored in the timer as soon as the output current reaches the maximum limitation value, and executing the safety function via a safety execution unit configured to suspend ascending of the window glass or descending the window glass when the output current is equal to or greater than the maximum limitation value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Figure 1:
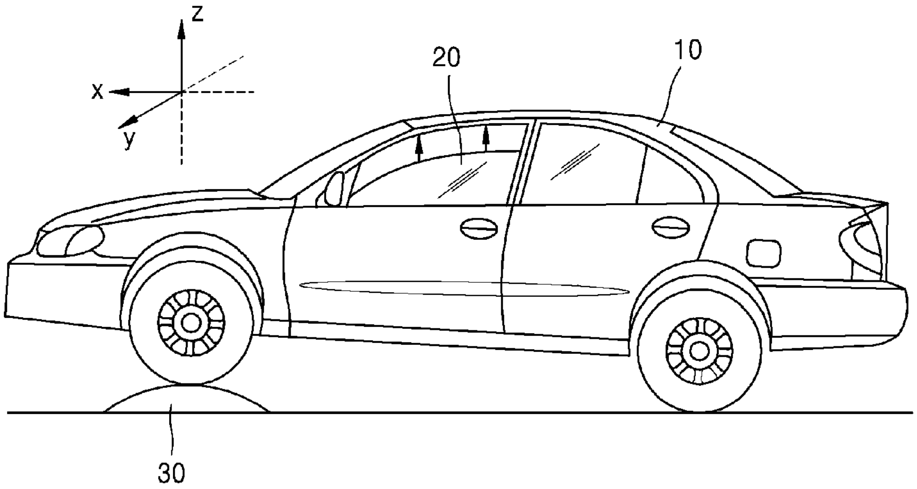
FIG. 1 shows an exemplary case when a vibration force or shock is applied to a car.

As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope are encompassed in the inventive concept.

While such terms as "first," "second," etc., may be used to describe various components, such components must not be limited to the above terms. The above terms are used only to distinguish one component from another. For example, a first element may be designated as a second element, and similarly, a second element may be designated as a first element without departing from the teachings of the inventive concept.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the inventive concept will be described more fully with reference to the accompanying drawings, in which exemplary embodiments of the inventive concept are shown. Like reference numerals in the drawings denote like elements.

Figure 2:
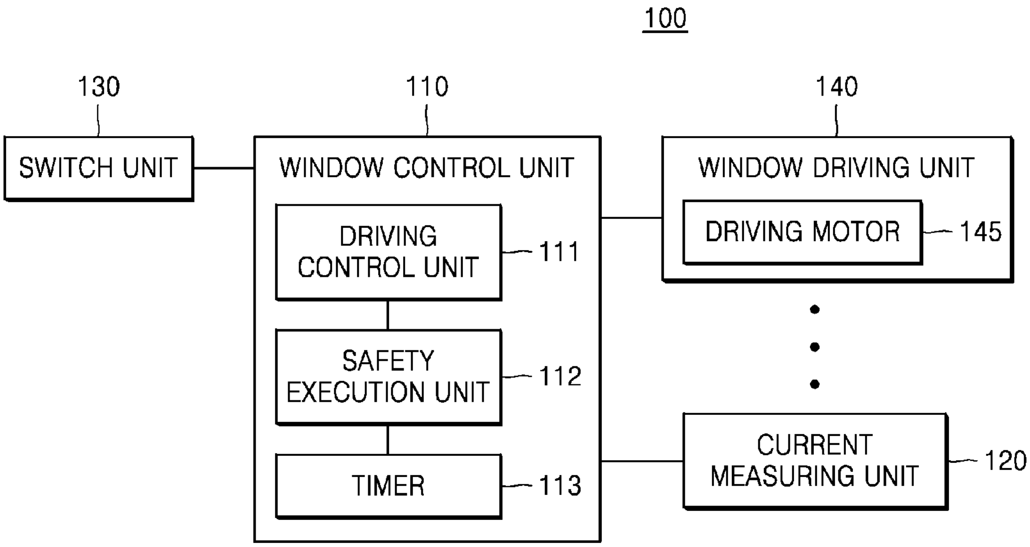
FIG. 2 is a block diagram of an apparatus for controlling a power window by using an output current of a motor, according to an embodiment of the inventive concept.

FIG. 2 is a block diagram of a power window control apparatus using an output current of a motor, according to an embodiment of the inventive concept.

Referring to FIG. 2, the power window control apparatus 100 using the output current of the motor includes a window controller 110, a current measurement unit 120, a switch unit 130, and a window driving unit 140.

The switch unit 130 controls ascending of a window glass according to manipulation of a user, and the window driving unit 140 rotates a driving motor according to a control signal to ascend the window glass.

The switch unit 130 generates a manipulation signal for controlling ascending, descending, or interruption of motion of the window glass according to manipulation of the user.

In addition, the switch unit 130 operates in a manual manipulation mode, in which the window glass is opened and closed only by continuously manipulating a switch, and an auto manipulation mode, in which the window glass is completely opened and closed by manipulating the switch only once, for example, by pushing or pulling the switch. If the manipulation mode of the switch mode 130 is divided as above, the switch unit 130 may generate a manipulation signal in the auto manipulation mode or the manual manipulation mode according to the manipulation characteristics of the user.

The window glass is opened and closed by rotation of a driving motor 145 in the window driving unit 140. The window driving unit 140 includes the driving motor 145, and the driving motor 145 is controlled by a control signal generated by the window control unit 110. The control signal for controlling the driving motor 145 is generated according to the manipulation signal generated by the switch unit 130, that is, the user's manipulation of the switch unit 130, during the normal operation. However, if an actual obstacle is sensed during ascending of the window glass, the window control unit 110 generates a control signal for stopping or reversing a motion of the driving motor 145 and transmits the control signal to the driving motor 145.

The safety function is a function for automatically stopping the ascending of the window glass or reversing a motion of the window glass when an obstacle is sensed during the ascending of the window glass. When a driver or a passenger closes the window glass by manipulating the switch, the ascending of the window glass is automatically stopped or reversed when the obstacle is sensed in order to prevent an accident when a body part or an object becomes stuck between the window glass and a window frame.

The current measuring unit 120 measures an output current of the driving motor 145 that drives the window glass. The output current of the driving motor 145 is in proportion to the number of revolutions of the driving motor 145, and thus, the number of revolutions of the driving motor 145 may be obtained by analyzing the output current. The value of the output current measured by the current measuring unit 120 is sent to the window control unit 110.

The window control unit 110 generates the control signal for controlling the driving motor 145 according to the manipulation of the switch unit 130, and executes the above-described safety function.

The window control unit 110 includes a driving control unit 111, a safety execution unit 112, and a timer 113.

The driving control unit 111 generally controls operations of the driving motor 145 according to the manipulation signal.

The timer 113 analyzes the output current to calculate the current reduction time during which the output current is reduced and store the calculated current reduction time.

If the car moves on an unpaved road or road bumps, the car moves up and down and the window glass also vibrates. If the obstacle is stuck between the window glass and the window frame during the ascending of the window glass while the car does not move or moves on a normal road, a speed of the driving motor 145 does not increase, but is continuously reduced. However, if the car moves on the rough road, for example, over bumps, the speed of the driving motor 145 irregularly changes up and down. That is, if the car moves on the road under harsh conditions (for example, an unpaved road or a road with many bumps), a section in which the driving motor 145 gets faster, that is, the output current of the driving current is reduced, is essentially generated. According to the embodiment of the inventive concept, when the section in which the output current of the driving motor 145 is reduced is detected, it is determined that the car moves on a road under harsh conditions, and the execution of the safety function is delayed as much as the time stored in the timer 113 that will be described later.

Therefore, the safety execution unit 112 analyzes the output current. Then, the safety execution unit 112 delays the execution of the safety function as much as the current reduction time stored in the timer 113 at the moment when the output current reaches the maximum limitation value, and then, executes the safety function for stopping the ascending of the window glass or reversing the ascending of the window glass according to a result of comparing the output current with the maximum limitation value.

If the output current is equal to or greater than the maximum limitation value even after the execution of the safety function is delayed as much as the current reduction time, the safety execution unit 112 executes the safety function. In addition, if the output current is less than the maximum limitation value after the execution of the safety function is delayed as much as the current reduction time, the safety execution unit 112 does not execute the safety function.

The timer 113 operates as a buffer and stores the current reduction time during the last section from among the sections in which the output current is reduced. Also, the timer 113 analyzes the output current and deletes the stored current reduction time if the output current is stabilized and is maintained at a constant level. Also, the timer 113 may delete the stored current reduction time if the window glass remains in the stopped state for a predetermined time after the car is started.

That is, if the car moves normally or is in a stopped state, the current reduction time stored in the timer 113 is deleted and the timer 113 does not store any information.

Therefore, if the current reduction time is not stored in the timer 113, the safety execution unit 112 may execute the safety function as soon as the output current reaches the maximum limitation value.

Figure 3:
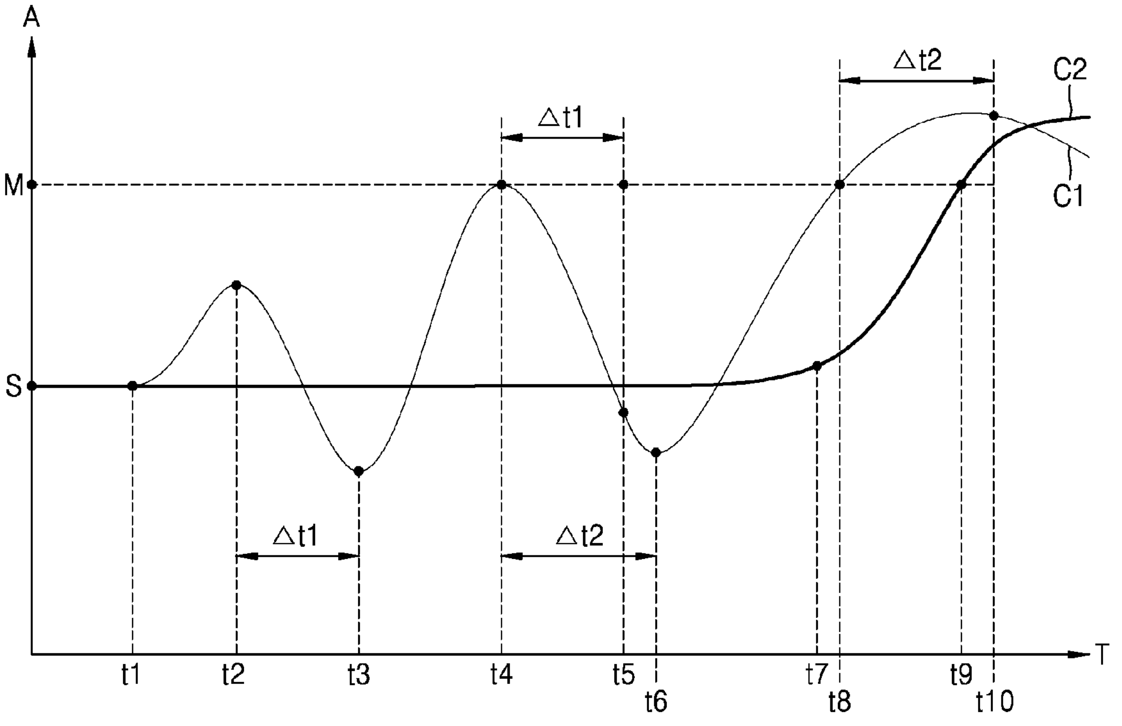
FIG. 3 is a graph showing execution of a safety function according to the output current of the motor.

FIG. 3 is a graph showing execution of the safety function according to the output current of the driving motor 145.

In the graph of FIG. 3, the horizontal axis denotes time and the vertical axis denotes the output current of the driving motor 145.

In FIG. 3, a curve c1 denotes the output current measured when the window glass is moving up while the car is moving on an unpaved road or over a bump, and a curve c2 denotes the output current measured when the window glass is moving up while the car is moving on a normal road.

According to the curve c2, the output current remains at a stabilized current level S until a time point t7, and after t7, the output current increases and reaches the maximum limitation value M at t9. According to the curve c2, the output current is stabilized, and since there is no section in which the output current is reduced, the timer 113 does not store information about the current reduction time.

Therefore, according to the curve c2, it may be determined that the actual obstacle is stuck between the window glass and the window frame after t7, and the safety function is instantly executed at the time point t9.

Referring to FIG. 3, according to the curve c1, the output current is reduced in a section between t2 and t3 and a section between t4 and t6, and is increased in a section between t3 and t4 and a section between t6 and t8.

The timer 113 stores $\Delta t1$ as the current reduction time after t3 and stores $\Delta t2$ as the current reduction time after t6. Since the current reduction time during the last current reducing section is stored in the timer 113, the timer 113 only stores $\Delta t1$ in the section between t3 and t4 and only stores $\Delta t2$ after the time point t6.

At the time point t4, the output current of c1 reaches the maximum limitation value M, and the safety execution unit 112 awaits for a time period $\Delta t1$ from the time point t4 and compares the output current with the maximum limitation value M. At the time point t5 after the time period $\Delta t1$ has passed from the time point t4, since the output current is less than the maximum limitation value M, the safety execution unit 112 does not execute the safety function.

In addition, at the time point t8, the output current of c1 reaches the maximum limitation value M, and the safety execution unit 112 awaits for the time period $\Delta t2$ from the time point t8 and compares the output current with the maximum limitation value M. At the time point t10 after the time period $\Delta t2$ has passed from the time point t8, since the output current is equal to or greater than the maximum limitation value M, the safety execution unit 112 instantly executes the safety function at the time point t10.

Hereinafter, a method of controlling the power window by using an output current of the driving motor will be described below. Descriptions about the elements described above with reference to FIGS. 2 and 3 are not repeated.

Figure 4:
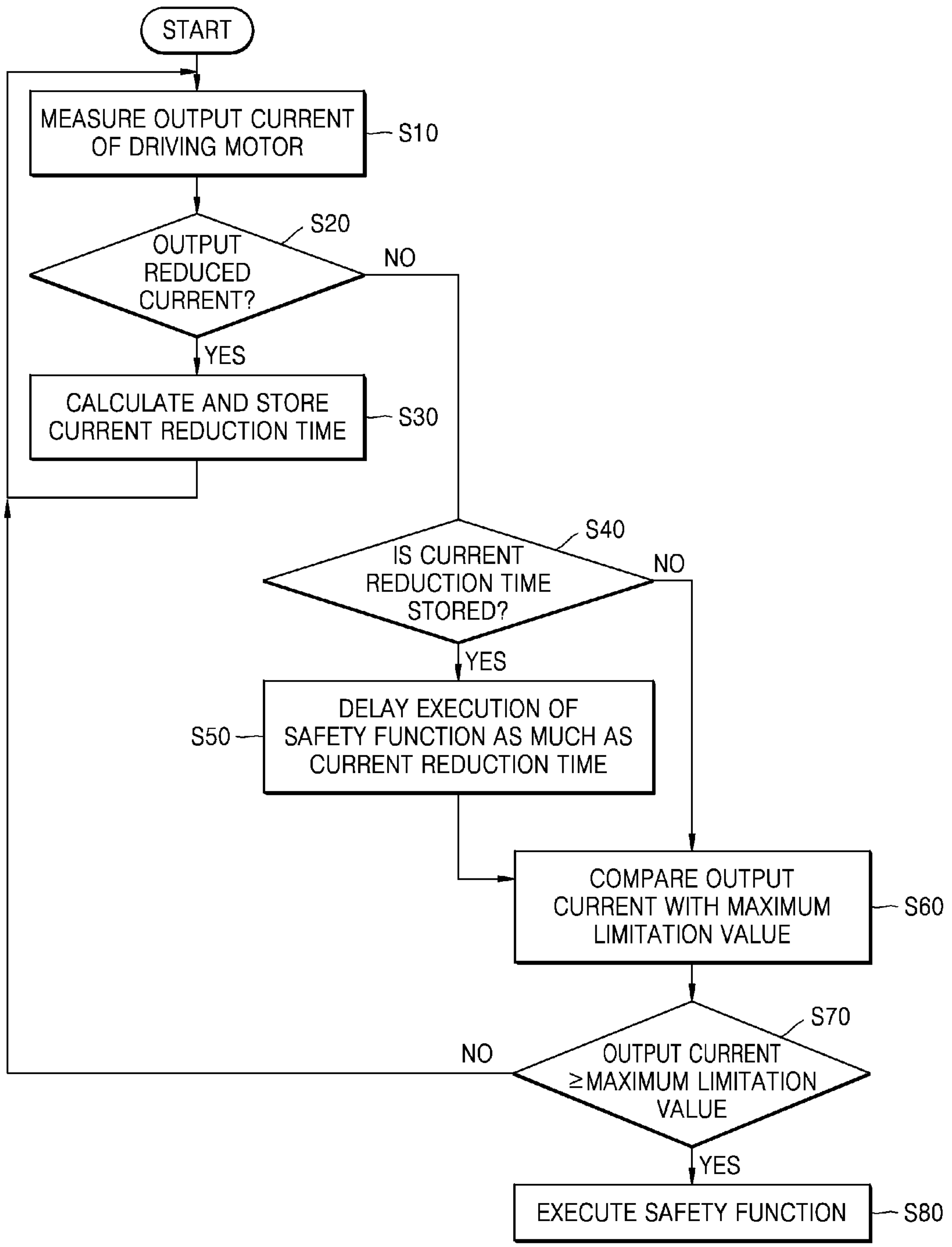
FIG. 4 is a flowchart of a method of controlling a power window by using an output current of a motor, according to an embodiment of the inventive concept.

FIG. 4 is a flowchart of a method of controlling the power window by using the output current of the driving motor 145.

The current measuring unit 120 measures the output current that is in proportion to the number of revolutions of the driving motor 145 that drives the window glass (S10).

The timer 113 analyzes the output current to determine whether the output current has increased or decreased (S20).

If the output current has decreased, the timer 113 calculates the current reduction time, that is, a time during the section when the output current has decreased, and stores the current reduction time (S30). Then, the process goes to operation S10.

If the output current has increased, the safety execution unit 112 determines whether the timer 113 stores information about the current reduction time (S40).

If it is determined that the timer 113 stores the current reduction time, the safety execution unit 112 delays the execution of the safety function as much as the current reduction time (S50), and compares the output current with the maximum limitation value (S60).

If it is determined that the timer 113 does not store the current reduction time in operation S40, the safety execution unit 112 does not delay the execution of the safety function and compares the output current with the maximum limitation value (S60).

The safety execution unit 112 determines whether the output current is equal to or greater than the maximum limitation value (S70), and executes the safety function instantly if the output current is equal to or greater than the maximum limitation value (S80). Otherwise, the process goes to operation S10.

As described above, according to the one or more of the above, the interruption of the ascending of the window glass due to the noise generated when the car moves on an unpaved road or road bumps may be distinguished from the interruption caused by the actual obstacle without using an additional sensor. Thus, the safety function may be prevented from being executed when the ascending of the window glass is interrupted due to the noise.

The inventive concept can also be embodied as computer readable codes on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributive manner.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An apparatus for controlling a power window by using an output current of a motor, the apparatus comprising:

a current measuring unit for measuring an output current of a driving motor, the output current being proportional to a number of revolutions of the driving motor configured to drive a window glass;

a timer for analyzing the output current and for calculating and storing a current reduction time, the current reduction time being equal to a time period of a section where the output current is reduced; and a safety execution unit for analyzing the output current, delay execution of a safety function as much as the current reduction time when the output current reaches a maximum limitation value, and executing the safety function for suspending ascending of the window glass or descending the window glass according to a result of comparing the output current with the maximum limitation value, wherein the timer is configured to store the current reduction time during a last section when the output current is reduced, wherein the timer is configured to delete the current reduction time stored in the timer when the output current is stabilized, wherein the safety execution unit is configured to execute the safety function as soon as the output current reaches the maximum limitation value, when the timer does not store the current reduction time.

2. The apparatus of claim 1, wherein the safety execution unit is configured to execute the safety function when the output current is equal to or greater than the maximum limitation value and is configured not to execute the safety function when the output current is less than the maximum limitation value.

3. The apparatus of claim 1, wherein the timer is configured to delete the current reduction time stored in the timer when the window glass is in a stopped state for a reference time after starting a car whereon the apparatus is mounted.

4. The apparatus of claim 3, wherein the safety execution unit is configured to execute the safety function as soon as the output current reaches the maximum limitation value, when the timer does not store the current reduction time.

5. A method of controlling a power window by using an output current of a driving motor, the method comprising:

measuring the output current of the driving motor via a current measuring unit, the output current being proportional to a number of revolutions of the driving motor configured to drive a window glass;

analyzing the output current via a timer, and calculating and storing a current reduction time, the current reduction time being equal to a time period of a section where the output current is reduced; and delaying execution of a safety function as much as the current reduction time stored in the timer as soon as the output current reaches the maximum limitation value, and executing the safety function via a safety execution unit configured to suspend ascending of the window glass or descending the window glass when the output current is equal to or greater than the maximum limitation value, wherein the safety execution unit is further configured to execute the safety function when the output current is equal to or greater than the maximum limitation value, and is further configured not to execute wherein the safety execution unit is further configured to execute the safety function as soon as the output current reaches the maximum limitation value, when the timer does not store the current reduction time.

6. The method of claim 5, wherein the timer is configured to store the current reduction time during a last section when the output current is reduced.

7. The method of claim 5, wherein the timer is further configured to delete the current reduction time stored in the timer when the output current is stabilized.

8. The method of claim 5, wherein the timer is configured to delete the current reduction time stored in the timer when the window glass is in a stopped state for a reference time after starting a car whereon the power window is mounted.

9. The method of claim 6, wherein the safety execution unit is further configured to execute the safety function as soon as the output current reaches the maximum limitation value, when the timer does not store the current reduction time.

* * * * *